(12) United States Patent
Thelin et al.

(10) Patent No.: US 10,029,312 B2
(45) Date of Patent: Jul. 24, 2018

(54) COUPLING FOR A COOLING SYSTEM IN A CUTTING TOOL AND A BLADE

(71) Applicant: SECO TOOLS AB, Fagersta (SE)

(72) Inventors: Jimmy Thelin, Fagersta (SE); Mats Jonsson, Hedemora (SE); Johan Elofsson, Fagersta (SE)

(73) Assignee: SECO TOOLS AB, Fagersta (SE)

( * ) Notice: Subject to any disclaimer, the term of this patent is extended or adjusted under 35 U.S.C. 154(b) by 196 days.

(21) Appl. No.: 14/653,819

(22) PCT Filed: Dec. 12, 2013

(86) PCT No.: PCT/EP2013/076311
§ 371 (c)(1),
(2) Date: Jun. 18, 2015

(87) PCT Pub. No.: WO2014/095545
PCT Pub. Date: Jun. 26, 2014

(65) Prior Publication Data
US 2015/0321263 A1    Nov. 12, 2015

(30) Foreign Application Priority Data
Dec. 19, 2012   (EP) .................................... 12197927

(51) Int. Cl.
*B23B 27/10* (2006.01)
*B23B 27/08* (2006.01)
*B23B 29/04* (2006.01)

(52) U.S. Cl.
CPC .............. *B23B 27/10* (2013.01); *B23B 27/08* (2013.01); *B23B 29/043* (2013.01); *B23B 2205/02* (2013.01); *B23B 2250/12* (2013.01); *B23B 2260/124* (2013.01); *B23C 2240/245* (2013.01); *Y10T 407/14* (2015.01)

(58) Field of Classification Search
CPC ...... B23B 27/10; B23B 27/04; B23B 2250/12
See application file for complete search history.

(56) References Cited

U.S. PATENT DOCUMENTS

| | | | | |
|---|---|---|---|---|
| 2,848,790 A | * | 8/1958 | McMann | ................ B23B 27/10 407/11 |
| 3,798,725 A | * | 3/1974 | Hanson | ................... B23B 29/04 407/108 |
| 4,938,641 A | | 7/1990 | Maier | |
| 4,955,264 A | * | 9/1990 | Armbrust | ................ B23B 25/02 407/11 |

(Continued)

FOREIGN PATENT DOCUMENTS

| | | |
|---|---|---|
| WO | 9206817 A2 | 4/1992 |
| WO | 2012169031 A1 | 12/2012 |

*Primary Examiner* — Alan Snyder
(74) *Attorney, Agent, or Firm* — Corrine R. Gorski

(57) ABSTRACT

A coupling and a blade for a cooling system in a cutting tool includes a first member including a shank having a first end and a second end. The first end of the shank defines a first end of the first member, and a head of the first member disposed at the second end of the shank and a top of the head of the first member defines a second end of the first member. The head of the first member is frustoconical and the first member includes a longitudinal passage in the shank. A radial opening in the head of the first member is in fluid communication with the longitudinal passage.

12 Claims, 4 Drawing Sheets

(56) References Cited

U.S. PATENT DOCUMENTS

| | | |
|---|---|---|
| 2006/0257217 A1* | 11/2006 | Berminge .............. B23B 27/04 407/117 |
| 2007/0283794 A1 | 12/2007 | Giannetti |
| 2007/0286689 A1 | 12/2007 | Giannetti |
| 2008/0124180 A1 | 5/2008 | Breisch |
| 2012/0230780 A1 | 9/2012 | Henry et al. |
| 2012/0230781 A1 | 9/2012 | Hoffer et al. |
| 2012/0275876 A1 | 11/2012 | Lehto et al. |
| 2013/0217313 A1 | 8/2013 | Butler et al. |

* cited by examiner

COUPLING FOR A COOLING SYSTEM IN A CUTTING TOOL AND A BLADE

RELATED APPLICATION DATA

This application is a § 371 National Stage Application of PCT International Application No. PCT/EP2013/076311 filed Dec. 12, 2013 claiming priority of EP Application No. 12197927.2, filed Dec. 19, 2012.

BACKGROUND AND SUMMARY

The present invention relates generally to couplings and, more specifically, to couplings for cooling systems in cutting tools and a blade.

In cutting tools such as parting tools that use a replaceable blade, in order to provide cooling and/or lubricating fluid at the site of the cutting operation, it is typically necessary to provide a bolt or screw head on a side of the blade facing the shank of the tool, necessitating provision of an opening in the surface of shank facing the blade, often in addition to openings for fastening the blade by screws.

It is desirable to provide a cooling system in a cutting tool that takes up minimal space. It is also desirable to provide a cooling system in a cutting tool that does not require provision of additional recesses or openings for receiving components of the cooling system. US20070283794A1, US20070286689A1, JP8039387A, and US20080124180A1 provide couplings having radial openings for fluid flow in a shank of a screw, below the head. Other couplings, such as shown in EP2394767A1, EP2517815A1, and WO9206817A2, have cylindrical heads with radial bores in the head. These structures present problems in connection with sealing and in connection with the thickness of the structures to which they can be mounted.

According to an aspect of the present invention, a coupling is provided for a cooling system in a cutting tool. The coupling comprises a first member comprising a shank having a first end and a second end, the first end of the shank defining a first end of the first member, and a head of the first member at the second end of the shank, a top of the head of the first member defining a second end of the first member. The head of the first member is frustoconical and the first member comprises a longitudinal passage in the shank, and a radial opening in the head of the first member in flow communication with the longitudinal passage.

According to another aspect of the invention, a blade for a cutting tool is provided, preferably for grooving and parting operations. The blade has a smooth side without protruding elements. The blade comprises two laterally extending openings. Each opening has a large diameter end and a small diameter end. The large diameter ends are facing in the opposite or same direction. A passage extends in the blade from an opening towards an end of the blade.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
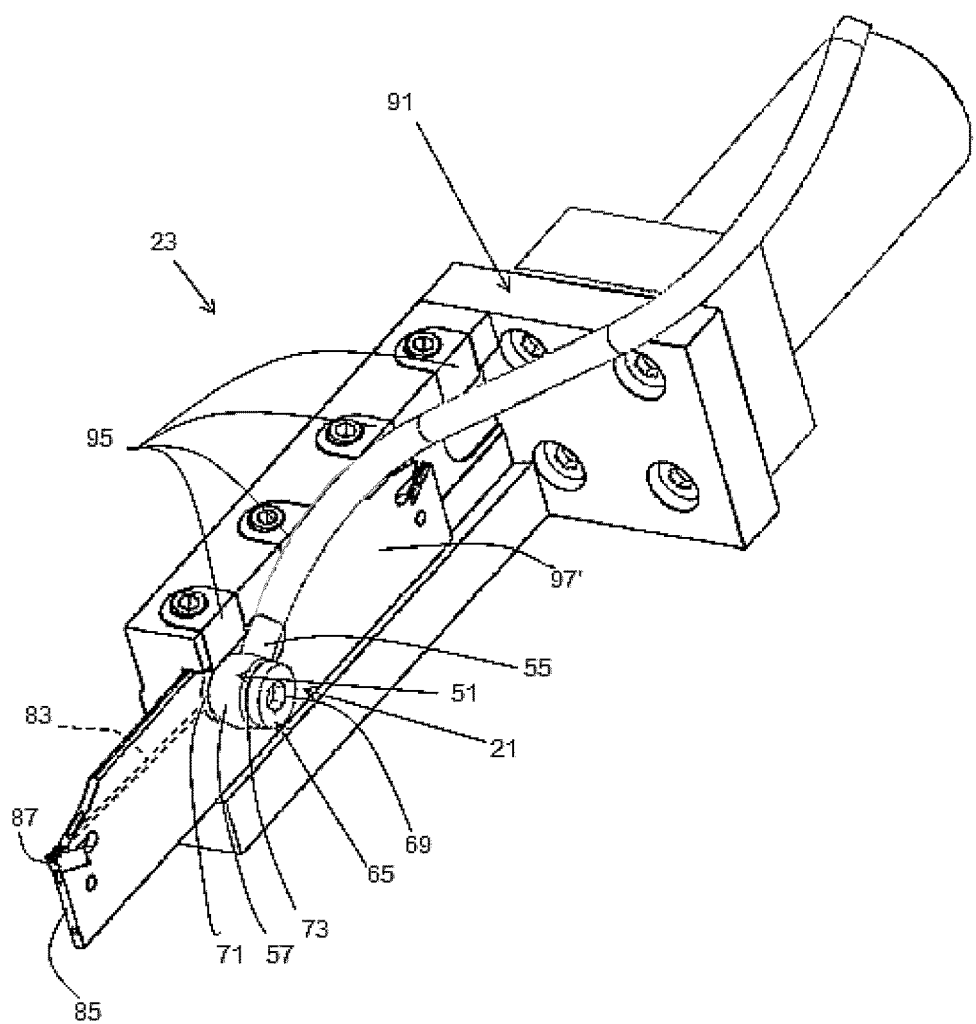
FIG. 1 is a perspective view of a coupling for a cooling system in a cutting tool according to an aspect of the present invention.
Figure 2:
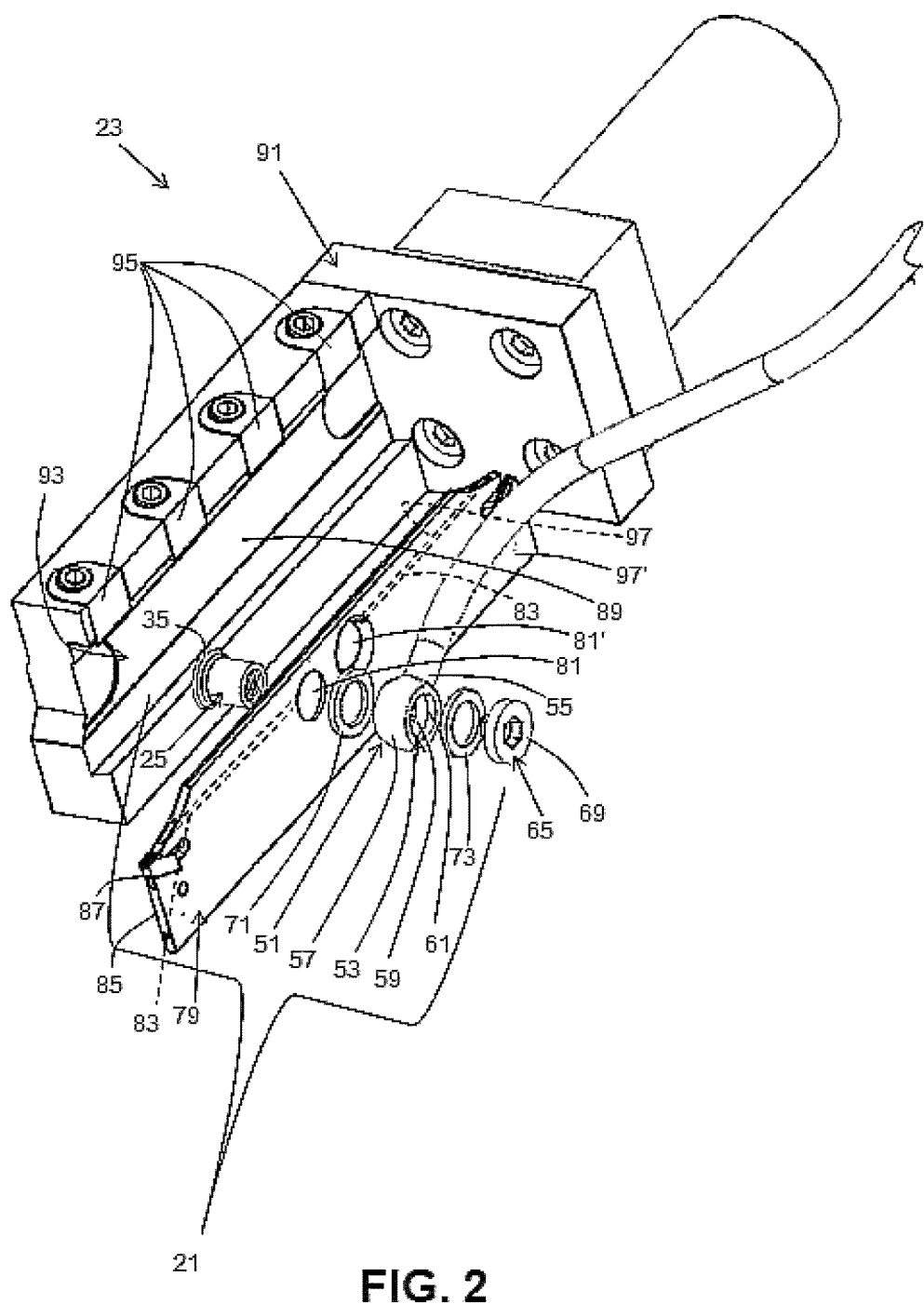
FIG. 2 is an exploded perspective view of the coupling for the cooling system in the cutting tool of FIG. 1.

FIGS. 1 and 2 show a cutting tool 23 having a coupling 21 for a cooling system in the cutting tool. While reference will be made to a "cooling system", it will be understood that the system may also or alternatively function to as a lubrication and/or chip breaking system. The cutting tool 23 is shown in the form of a parting tool having a member such as a tool shank 91, a component such as a blade 79 adapted to be attached to the tool shank along a side of the blade, and a replaceable cutting insert 87 attached to the blade. U.S. Pat. No. 5,031,492 discloses a cutting tool having a shank and blade with replaceable cutting insert of this general type and is incorporated by reference. It is desirable to adapt the protruding overhang or length of the blade while simultaneously not being limited by bulky couplings. A smooth side without protruding elements will allow adjustability of the inventive blade in conventional tool shanks.

A passage 83 (shown in phantom in FIG. 1) within the blade 79 for cooling and/or lubricating fluid extends from a laterally extending opening 81 for a first member 25 of the coupling 21 to a point near the first end 85 of the blade 79, ordinarily near the cutting insert 87 or cutting edge. It may be preferable to let the passage 83 exit at least from an upper clamping arm of the blade as shown in FIGS. 1 and 2.

The particular cutting tool 21 illustrated in FIG. 1 has a blade 29 that is indexable to two positions by turning the blade 180 degrees about a vertical axis X through the blade. Of course, non-indexable blades 29 as in U.S. Pat. No. 4,938,641 may alternatively be provided. The laterally extending opening 81 is larger in dimension on a smooth side 97 of the blade 79 facing a surface 89 of the tool shank and is shaped to permit the entire head 35 of the first member 25 to be flush with or recessed relative to the side of the blade facing the surface 89. Stated another way, the laterally extending opening 81 on the side 97 of the blade 79 receives the entire head 35 of the first member 25. For such an indexable blade 79, two openings 81 and 81' are ordinarily formed in the blade. The opening 81' is larger on the side 97' facing away from the tool shank and smaller on the side 97 facing the tool shank and is used to fasten the blade 79 to the tool shank 27 or is unused, and the opening 81 is used to receive the first member 25 and is smaller on the side 97' facing away from the tool shank and larger on the side 97 facing the tool shank. The opening 81' may be used to receive a bolt to secure the blade 79 to the shank 91, or may simply not be used and the blade may be secured to the shank by some other means, such as by clamps 95. When the blade 79 is indexed by turning the blade 180 degrees about its vertical axis X, then the large end of the opening 81' faces the shank 91 and the large end of the opening 81 faces outwardly. The blade 79 may alternatively be indexable to two positions by rotating the blade about a horizontal axis, such as where a cutting insert can be mounted on opposite top and bottom corners of the blade, whereby the large ends of the openings 81, 81' are facing in the same direction, and may be indexable to four positions by rotating the blade about either the horizontal or vertical axis, such as where a cutting insert is mountable at four corners of the blade. Thus, the blade itself comprises two laterally extending openings 81, 81' each having a large diameter end and a small diameter end, said large diameter ends are facing in the opposite or same direction.

The cutting tool 23 may have, instead of a blade with replaceable cutting inserts, a blade with edges that perform the cutting function. The cutting inserts on the blade, if provided, may also be indexable. The cutting tool 23 need not be a parting tool and it will be appreciated that the present invention has applications in virtually any type of cutting tool for which it is desired to direct cooling and/or lubricating fluid to a particular location.

The coupling 21 facilitates providing cooling and/or lubricating fluid to a point on the blade 79, such as at the first end 85 near the cutting insert 87, without the need for forming recesses in the tool shank 91 to receive a nut or bolt or screw heads of fluid fittings.

FIGS. 1 and 2 show a coupling 21 for a cooling system in a cutting tool 23 according to an aspect of the present invention in an assembled state (FIG. 1) and an exploded state (FIG. 2). The coupling 21 comprises a first member 25 comprising a shank 27 having a first end 29 and a second end 31. The first end 29 of the shank 27 defines a first end 33 of the first member 25. A head 35 is disposed at the second end 31 of the shank 27, a top 37 of the head defining a second end 39 of the first member 25. A bottom 41 of the head 35 is ordinarily frustoconical and the first member 25 comprises a longitudinal passage 43 in the shank 27 and a radial opening 45 in the head in flow communication with the longitudinal passage. The bottom 41 of the head 35 forms an angle Φ with an axis of the first member 25.

Figure 3B:
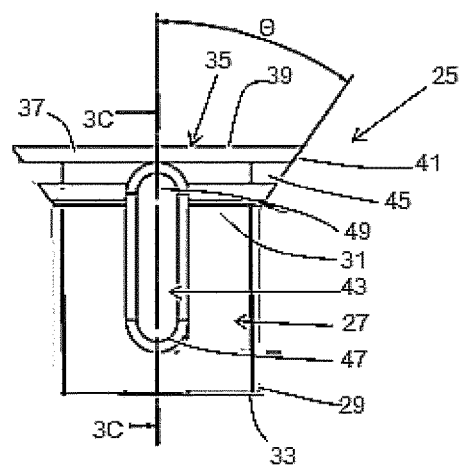
FIGS. 3A-3D are a perspective, a side, a side, cross-sectional, and a top view, respectively, of a first member of coupling of a cooling system in a cutting tool according to an aspect of the present invention.
Figure 3C:
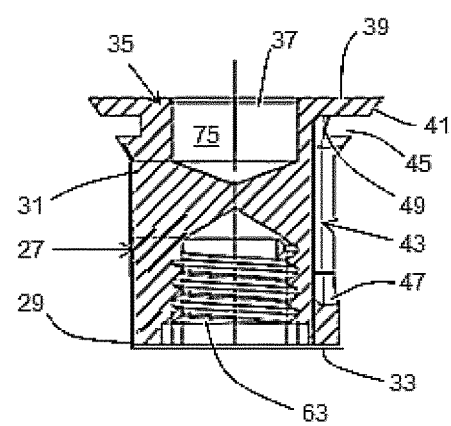
Figure 3D:
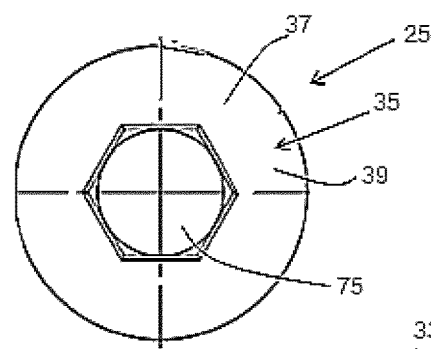
Figure 3A:
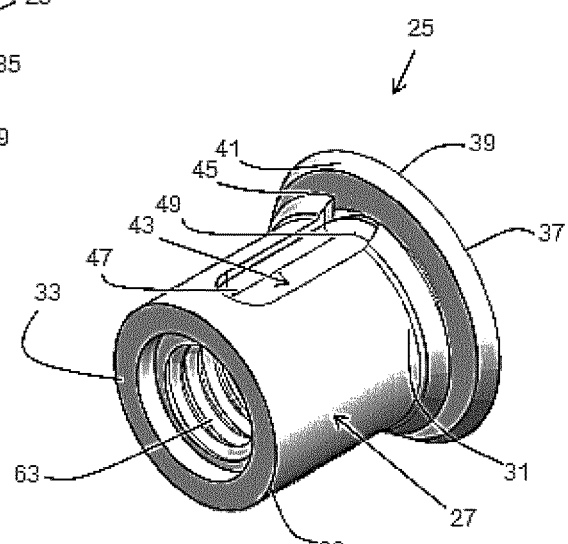
Figure 4B:
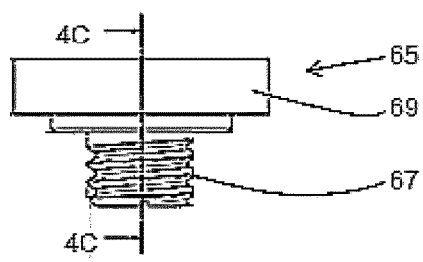
FIGS. 4A-4D are a perspective, a side, a side, cross-sectional, and a top view, respectively, of a second member of coupling of a cooling system in a cutting tool according to an aspect of the present invention.
Figure 4C:
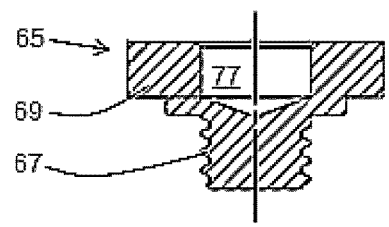
Figure 4D:
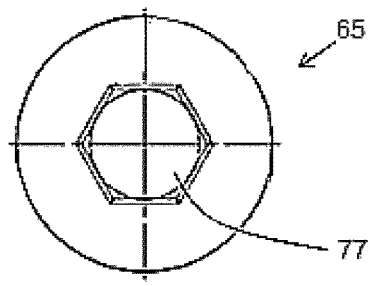
Figure 4A:
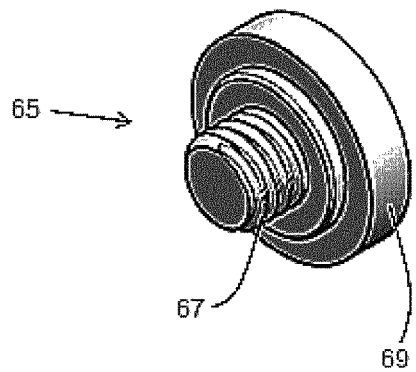

The longitudinal passage 43 is ordinarily fully or at least partially disposed on an exterior surface of the first member 25. As seen in FIGS. 3A-3C, the longitudinal passage 43 can be in the form of a groove having a first end 47 spaced at a distance from the first end 33 of the first member 25 and a second end 49 that extends to a point in the head 35 spaced axially from the second end 39 of the first member, ordinarily to the radial opening 45. The radial opening 45 is ordinarily in the form of an annular groove in the head 35.

A ring member 51 having an internal opening 53 of sufficient size to receive the shank 27 of the first member 25 is provided. The ring member 51 has a hose coupling 55 on an exterior side 57 of the ring member, and an annular passage 59 (FIG. 2) in a surface of the internal opening, the annular passage having a greater diameter than a surrounding portion 61 of the internal opening, and a radial passage extending through the hose coupling to the annular passage.

The shank 27 of the first member 25 comprises an internally threaded opening 63. The coupling 21 further comprises a second member 65 that has external threads 67 that mate with the internal threads of the internally threaded opening 63 and a head 69. The ring member 51 is disposed between the head 35 of the first member 25 and the head 69 of second member 65. The ring member 51 is further disposed between a first gasket 71 between the ring member 51 and the head 35 of the first member 25 and a second gasket 73 between the ring member and the head 69 of the second member 65.

An axially extending, non-circular opening 75 can be provided in the head 35 of the first member 25, and an axially extending, non-circular opening 77 can be provided in the head 69 of the second member 65. The non-circular openings 75 and 77 are ordinarily shaped to receive an Allen wrench or similar structure to facilitate tightening and loosening of the second member 65 relative to the first member 25.

The coupling 21 further comprises a blade 79 having a laterally extending opening 81 therein. The opening 81 has a diameter at least as large as a diameter of the shank 27 of the first member 25 and at least a portion of the laterally extending opening has a diameter smaller than a diameter of the head 35 of the first member. The head 35 of the first member 25 and the laterally extending opening 81 each have generally frustoconical shapes that form angles Φ (FIG. 3) with centerlines the first member and the laterally extending opening. The laterally extending opening 81 is of sufficient width and length so that the head 35 of the first member 25 is adapted to be completely disposed inside the laterally extending opening 81.

When the shank 27 of the first member 25 is inserted through the laterally extending opening 81 in the blade 79 and the head 35 of the first member is seated in the laterally extending opening, the first gasket 71, the ring 51, and the second gasket 73 can be placed around the shank of the first member in that order. Then, the external threads 67 of the second member 65 can be screwed into the internal threads in the internally threaded opening in the shank 27 of the first member 25. The head 69 of the second member 65 and the blade 79 will compress the gaskets 71 and 73 on opposite sides of the ring 51 as the second member is screwed more tightly into the internally threaded opening 53 in the shank of the first member and will seal the internal opening 53 of the ring. The frustoconical head 35 of the first member 25 contacts the frustoconical laterally extending opening 81 of the blade 79 and will seal the radial opening 45 in the head of the first member. The first member 25 may be made of a softer material than the blade 79 to facilitate forming the seal. For example, the first member 25 can be made of a relatively soft steel material, while a component in the form of a blade 79 can be made of a relatively hard steel material, such as a high speed steel material.

The blade 79 has a longitudinally extending passage 83 therein extending from a first end 85 of the blade to the laterally extending opening 81. The laterally extending opening 81 is aligned with the radial opening 45 of the head 35 of the first member 25. Accordingly, fluid can be introduced to the first end 85 of the blade 79, where there may be a cutting insert 87 mounted, through the hose coupling 55 to the annular passage 59 in the ring, to a space defined by the longitudinal passage 43 in the first member 25 and the ring 51, to the radial opening 45 in the head of the first member, and then to the longitudinally extending passage 83.

As seen in FIGS. 1 and 2, the coupling 21, including the blade 79, can be mounted flush against a surface 89 of a shank 91 comprising an opening 93 for receiving the blade because the top 37 of the head 35 of the first member 25 can be flush with or recessed relative to a surface of the blade 79. The blade 79 can be clamped relative to the shank 91 by any suitable means, such as by clamps 95 aligned along a top of the opening 93.

The laterally extending opening 81 can extend into or through the blade 79 or other component. For a cutting tool 23 including a blade 79 as shown, the opening 81 will ordinarily extend entirely through the blade 79, however, for other tools, the opening may extend only partially through the entire thickness of the tool, such as where an internal opening (not shown) in the tool is in flow communication with a fluid conduit in the tool and has internal threads for mating with the external threads 67 of the second member 65.

The claimed structure offers advantages including permitting the frustoconical shape of the head to perform a sealing function when the head is secured in a corresponding, frustoconical opening in, e.g., a blade holder. In addition, only a minimal axial length of the head needs to be disposed above the radial opening, permitting the coupling to be mounted in a number of locations that might otherwise require a complex arrangement. Thus convenience of mounting a coupling is improved.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 12197927.2, from which this application claims priority, are incorporated herein by reference.

The invention claimed is:

1. A blade for a cutting tool, for grooving and parting operations, the blade having a smooth side without protruding elements, the blade comprising two laterally extending openings, each opening having a large diameter end and a small diameter end, the large diameter ends facing in the opposite or same direction and a passage extending in the blade from at least one of the openings towards an end of the blade, wherein the blade has two opposite ends, and a first passage extends from a first one of the openings toward one of the two ends of the blade and a second passage extends from a second one of the openings toward one of the two ends of the blade.

2. The blade as set forth in claim 1, wherein the blade has two opposing smooth sides without protruding elements.

3. The blade as set forth in claim 1, wherein each of the openings extends through the blade from the smooth side of the blade to an opposite side of the blade.

4. A blade for a cutting tool, for grooving and parting operations, the blade having a smooth side without protruding elements, the blade comprising two laterally extending openings, each opening having a large diameter end and a small diameter end, the large diameter ends facing in the opposite or same direction and a passage extending in the blade from at least one of the openings towards an end of the blade, wherein each of the openings extends through the blade from the smooth side of the blade to an opposite side of the blade.

5. The blade as set forth in claim 4, wherein the blade has two opposite ends, and a first passage extends from a first one of the openings toward one of the two ends of the blade and a second passage extends from a second one of the openings toward one of the two ends of the blade.

6. The blade as set forth in claim 5, wherein each of the openings extends through the blade from the smooth side of the blade to an opposite side of the blade.

7. The blade as set forth in claim 4, wherein the blade has two opposing smooth sides without protruding elements.

8. A blade for a cutting tool, for grooving and parting operations, the blade having a smooth side without protruding elements, the blade comprising two laterally extending openings, each opening having a large diameter end and a small diameter end, the large diameter ends facing in the opposite or same direction and a passage extending in the blade from at least one of the openings towards an end of the blade, wherein the passage extends in the blade from a location between the large diameter end and the small diameter end of at least one of the openings towards the end of the blade.

9. The blade as set forth in claim 8, wherein the blade has two opposite ends, and a first passage extends from a first one of the openings toward one of the two ends of the blade and a second passage extends from a second one of the openings toward one of the two ends of the blade.

10. The blade as set forth in claim 9, wherein each of the openings extends through the blade from the smooth side of the blade to an opposite side of the blade.

11. The blade as set forth in claim 8, wherein each of the openings extends through the blade from the smooth side of the blade to an opposite side of the blade.

12. The blade as set forth in claim 8, wherein the blade has two opposing smooth sides without protruding elements.

* * * * *